No. 658,814. Patented Oct. 2, 1900.
W. STANLEY & H. M. SMITH.
MEANS FOR DELICATELY SUSPENDING MOVING PARTS.
(Application filed May 1, 1900.)
(No Model.)
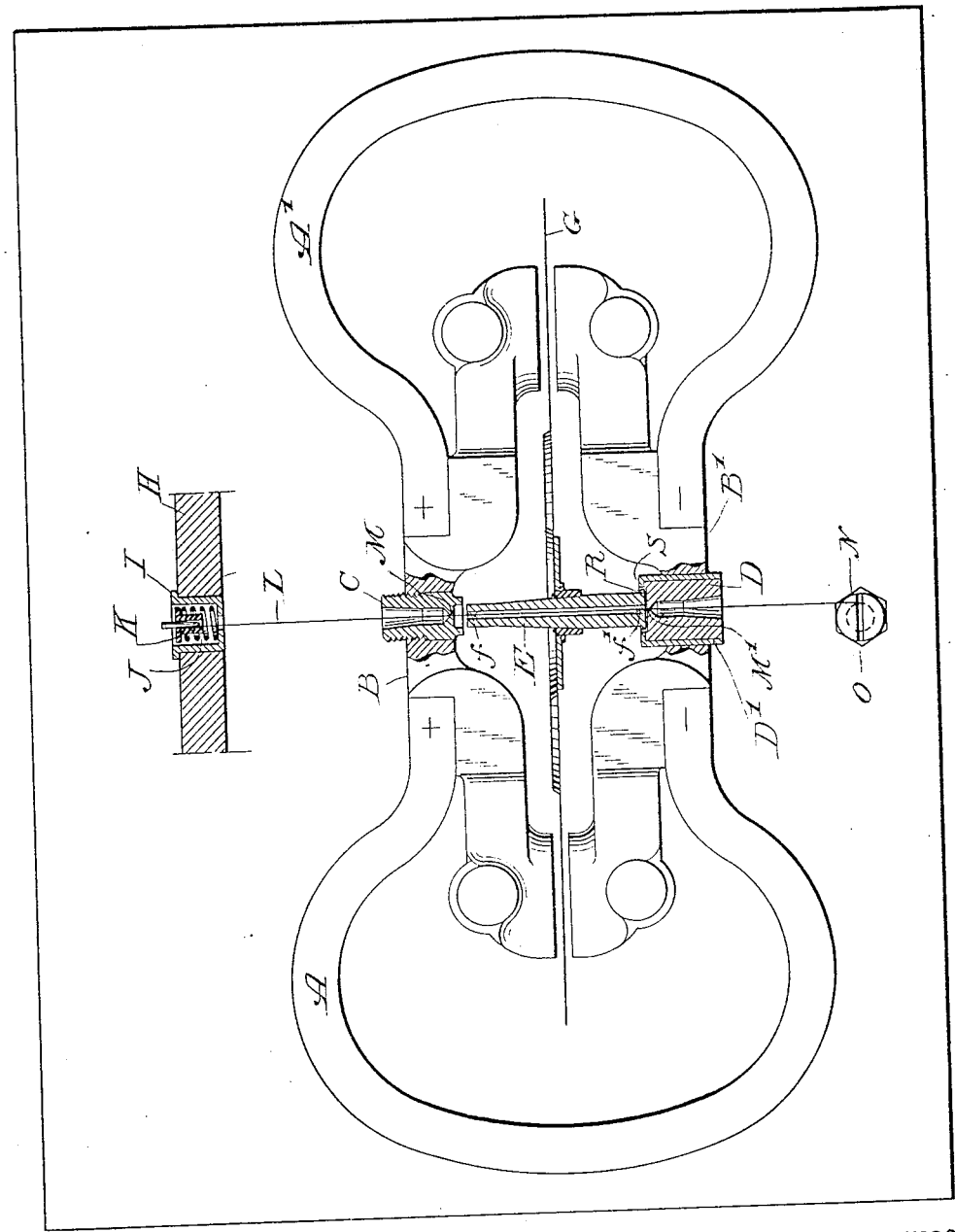
WITNESSES:
George T. Hackley.
E. R. Newell
INVENTORS
William Stanley,
Herbert M. Smith.
BY
ATTORNEY

MEANS FOR DELICATELY SUSPENDING MOVING PARTS.

SPECIFICATION forming part of Letters Patent No. 658,814, dated October 2, 1900.

Application filed May 1, 1900. Serial No. 15,125. (No model.)

*To all whom it may concern:*

Be it known that we, WILLIAM STANLEY and HERBERT M. SMITH, citizens of the United States, residing at Great Barrington, Berkshire county, Massachusetts, have invented certain new and useful Improvements in Means for Delicately Suspending Moving Parts, of which the following is a full, clear, and exact description.

Our invention relates to means for suspending the moving parts of mechanical devices, and has for its object, among other things, to produce a system of suspension in which the alinement shall be very perfect and easily obtained and in which the bearing-surfaces and mechanical friction may be reduced to a minimum and which shall be simple in construction and present few mechanical difficulties.

The following is a description of our invention, reference being had to the accompanying drawing, which illustrates an embodiment of the same in part of a meter structure.

Referring to the drawing, A A' are two permanent magnets, so arranged as to have adjacent poles of like polarity.

B B' are two pole-pieces, in which are inserted, respectively, a soft-steel plug or bushing C and a non-magnetic plug D with an external covering D', of soft steel. Between these is located a steel shaft E, having jewel or other bearings $ff$ and supporting a meter-disk G. In a lug H upon the meter-case is inserted a cup I, containing a compression-spring J, from which a fine steel wire L, fastened by means of a block K, passes through the holes M M' in the plugs or bushings C and D and also through the bearings $ff$ in the shaft E to the stud-screw N.

By screwing up the stud-screw N and securely fastening it with a jam-nut O the wire L can be drawn so tight that it will compress the spring J and form a perfectly-straight line between the points M M'. Prior to stretching the wire L the suspension core or shaft E is slipped over the wire, so that when the tightening takes place this suspension-core will be between the bushings or plugs C and D and with the apparatus in a vertical position will float upon the wire, being supported by the magnetic attraction due to the fields of the magnets. The two ends of the core E are cylindrical, and the adjacent openings in the bushings or plugs C and covering D' being also cylindrical the shaft E is magnetically suspended, the wire L serving simply to maintain the alinement. The shaft E always tends to return to its normal position out of contact with either of the bushings C or D by magnetic attraction, and its normal position is fixed by reason of the small flange R upon the shaft and the adjacent flange S upon the covering of the bushing D', which serves by reason of the localization of the magnetic flux to define the position of the shaft under normal conditions.

When constructed as above described, the suspension-core E and the disk which it supports may be said to truly float upon the magnetism of the system, and while it may be deflected upward or downward by any abnormal disturbing forces it will again find its own level of flotation and remain suspended in the air without end bearing-support when such disturbing forces are removed.

The advantage of this system of flotation over that which we have employed in the past consists, among other things, in the exquisite alinement that can be obtained by the use of the taut steel wire over any possible mechanical alinement that can be obtained when two separate staffs or pivots are employed, and, further, that it is possible by the use of a wire to have a central axis many times smaller in diameter than could be mechanically produced by means of staffs or pivots.

What we claim as our invention is—

1. In combination a movable support of magnetic material having internal bearing-surfaces, a taut wire passing through said support and engaging with said surfaces, and means for magnetically suspending said support.

2. In combination a rotatable shaft of magnetic material, a magnetic system producing a magnetic flux symmetrical thereto and a taut wire passing through the center of said rotatable shaft.

3. In combination a rotatable shaft of magnetic material, a magnetic system producing a magnetic flux symmetrical thereto, a taut wire passing through said rotatable shaft and engaging with alining bearings on said magnetic system.

4. In combination a taut wire, a movable shaft of magnetic material through which said wire passes, a magnetic system producing a flux symmetrical to said shaft and having alining bearings with which said taut wire engages, and means for elastically maintaining said wire taut.

Signed at Great Barrington, Massachusetts, this 28th day of April, 1900.

WILLIAM STANLEY.
HERBERT M. SMITH.

Witnesses:
JOSEPH C. FREIN,
JOHN S. STONE.